United States Patent [19]

Eaton

[11] 4,328,415
[45] May 4, 1982

[54] CARD AND CARD READER SYSTEM

[75] Inventor: Douglas J. Eaton, St. Leonards on Sea, England

[73] Assignee: International Standard Electric Corporation, New York, N.Y.

[21] Appl. No.: 140,456

[22] Filed: Apr. 17, 1980

[30] Foreign Application Priority Data

Apr. 17, 1979 [GB] United Kingdom ............... 13223/79

[51] Int. Cl.³ .............................................. G06K 7/08
[52] U.S. Cl. .................................. 235/451; 235/487; 235/488; 235/494
[58] Field of Search ............... 235/449, 450, 451, 456, 235/487, 488, 494

[56] References Cited

U.S. PATENT DOCUMENTS 3,585,368 6/1971 Nunamaker ......................... 235/451

*Primary Examiner*—Harold I. Pitts
*Attorney, Agent, or Firm*—William T. O'Neil

[57] ABSTRACT

A card reader for a viewdata terminal such as PRESTEL in which a code in the card is read and used to enable access to the viewdata computer and to charge the appropriate account for use of the viewdata system. The reader detects voltage signals from capacitive couplings between electrodes in the card and in the reader assesses whether they are greater or smaller than a reference level to give binary 1 or binary 0 and compensates for capacitance variations by means of a "dummy" cell which adjusts the reference. Any variations in the signals caused by dirt et cetera affects the dummy cell equally and hence adjusts the reference accordingly. The reader operates in the static mode.

16 Claims, 8 Drawing Figures

CARD AND CARD READER SYSTEM

BACKGROUND OF THE INVENTION

This invention relates to a card reader and to a card for use with the card reader.

A known card reader for, for example, a bank cash withdrawal terminal works on the principle of magnetic induction in a dynamic mode. The card has a ferric oxide strip which, as the card is inserted into the mouth of the card reader, is guided past a magnetic head, similar to a magnetic tape recorder head, and the head and associated circuitry reads the personal code recorded in the ferric oxide strip. This enables the terminal to dispense the cash and debit by the appropriate amount the account of that person, to whom the personal code was allocated.

With the advent of viewdata systems such as the British Post Office PRESTEL System it will be necessary for the computer to recognise to whom the charge for use of the system is to be billed. For some purposes it might be satisfactory for the terminal itself to be given an integral personal code and to bill a certain person as a consequence of the use of that particular terminal. Clearly however such an arrangement has drawbacks, the main one being that where such a terminal is shared amongst a number of users it is not possible for the computer to bill the various users separately. Another drawback arises through fraudulent or unauthorised use of the terminal which, once again, runs up a bill against one person, usually the owner or lessee, but not the user.

Hence a better solution would be to equip each terminal with a card reader and provide each prospective user of the viewdata system with his own personal card so that the pertaining personal account will be debited each time the terminal is used.

DESCRIPTION OF THE PRIOR ART

REMVAC UK Pat. No. 1375087 is known and discloses a capacitive card reader system. It is believed this prior art device, which is believed to be the most relevant prior art is prone to unreliable operation particularly where dirt occurs between the card and the reader, or, for example, if the card becomes distorted.

OBJECTS OF THE INVENTION

It is an object of the present invention to provide a card and card reader suitable for use with a viewdata terminal but applicable generally, for example wherever only authorised use of equipment is to be allowed, be it for billing or otherwise. It is a further object to provide a card reader system which overcomes the difficulties outlined above with respect to the prior art.

SUMMARY OF THE INVENTION

According to the present invention there is provided a card reading system in which a plurality of first conductive areas on a card reader co-operate with a plurality of second conductive areas on the card being read to form a plurality of capacitive couplings, the second conductive areas being positioned at spaced apart locations along a conductive leg connected to a driven electrode on the card, the driven electrode being arranged to be capacitatively coupled to a driving electrode on the reader for charging the capacitive couplings, said locations corresponding to the first conductive areas, the second conductive areas being present and connected to the leg, or present and disconnected from the leg, or absent, according to the desired configuration by which information is encoded on the card, at least one of said second conductive areas and the cooperating first conductive area being designed to form a test capacitive coupling whereby a reference level is set against which the output values of the first conductive areas are compared to enable the card reader to read the information encoded in the card.

In order that the invention can be clearly understood reference will now be made to the accompanying drawings wherein various parts of a card reader according to an embodiment of the invention are shown. In particular:

DESCRIPTION OF THE PREFERRED EMBODIMENTS

Figure 1:
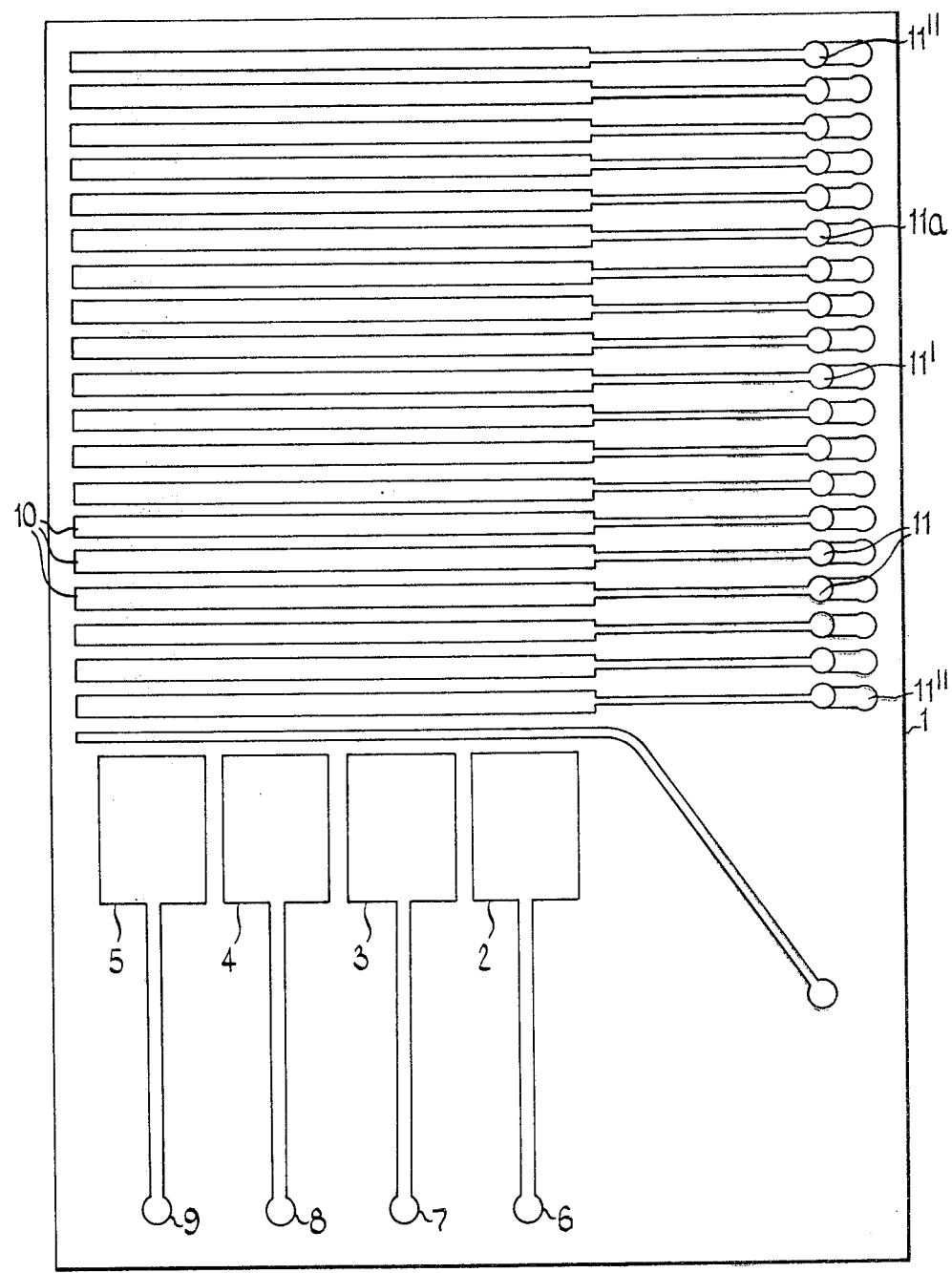
FIG. 1 shows an electrode configuration of the card reader.

Referring to FIG. 1 there is shown a printed circuit board 1 having four drive printed electrodes 2, 3, 4 and 5 connected to terminals 6, 7, 8 and 9 respectively. The board 1 has nineteen signal electrodes such as 10 connected to respective connection terminals such as 11.

Figure 2:
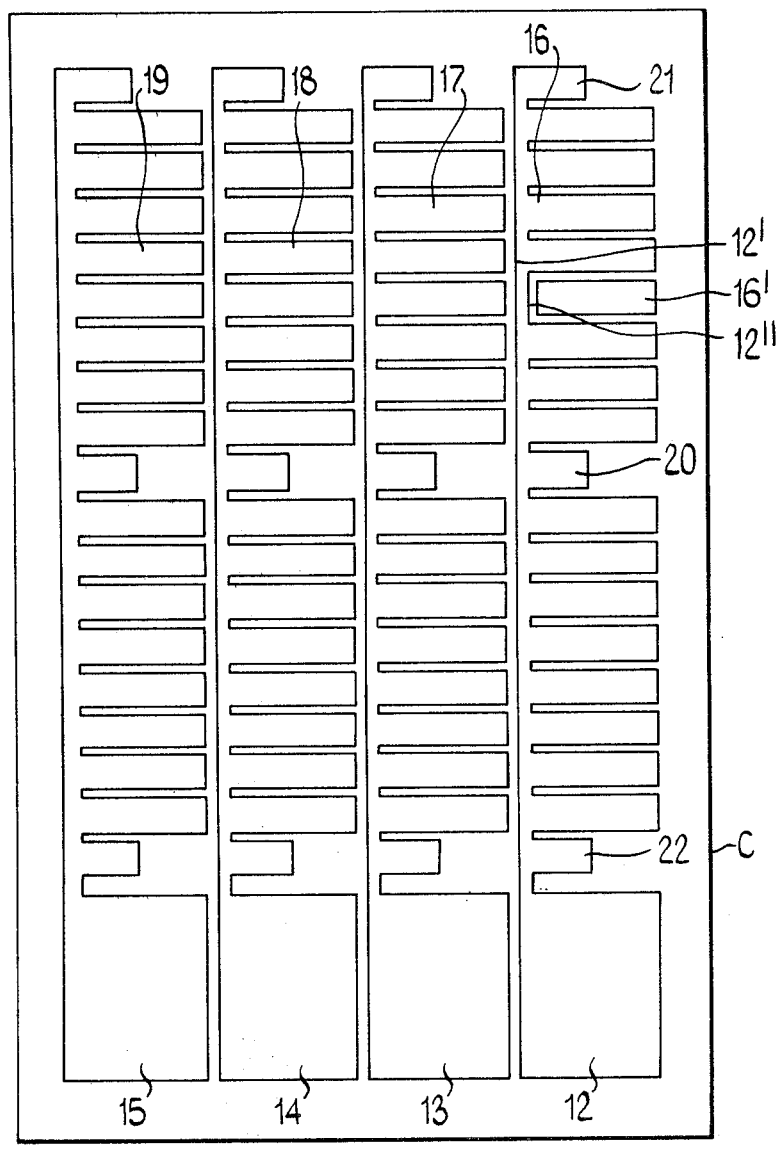
FIG. 2 shows an electrode configuration of a card suitable for use with the electrode configuration of FIG. 1.

Referring to FIG. 2 a card C to be read has four driven electrodes 12, 13, 14 and 15 which co-operate with and have the same configuration as the electrodes 2, 3 4 and 5, respectively. Each driven electrode is associated with a set of conductive areas such as 16, 17, 18 and 19 the areas of a set having the same pitch as the signal electrodes 10 of the card reader. The presence or absence of a conductive area in the four sets will represent a 1 or 0 respectively in a binary code so that the presence or absence of all the areas in the four sets shown (sixty four in all apart from half areas 20, 21 and 22) represents the total combination forming the code. For example the presence of all conductive areas is one unique code. The omission of one area in one set would form a second unique code. Thus it can be seen that, in the embodiment described, the total number of unique codes available is $2^{64}$, approximately $18 \times 10^{18}$.

When the card is placed in close proximity to the reader circuit board 1 and in registration with it, it can be seen that each conductive area forms a capacitive coupling with the proximate signal electrode 10.

If the drive electrode such as 2 has a ramp voltage applied via terminal 6 such as to produce a substantially constant current in the capacitor formed by electrode 2 of the reader and electrode 12 on the card, then signal voltages will appear at each of the connection terminals 11 in consequence of the capacitive couplings formed between the co-operating conductive areas 16 and the signal electrodes 10. When an associated area 16 is present and connected to driven electrode 12 (all except 16' are actually shown as connected) then the signal voltage at the pertaining terminal 11 will be greater than a reference level, representing binary 1. If on the other hand an associated area such as 16' is absent or at least is not connected with the electrode 12, then the signal voltage at the pertaining terminal 11 will be below the reference level, representing binary 0. As shown area 16' is separated by a gap 12" from the feed line 12' and hence is effectively absent.

In order to overcome variations in the capacitance of the couplings, caused for example by manufacturing tolerances or dirt on the face of the card or undue manual pressure, if such is required to hold the card in place on the reader, a half-size conductive area such as 20 is provided which is always present, i.e. it does not form part of the code-building. The magnitude of the output signal derived from the pertaining terminal 11' when electrode 12 is driven can be expected to be midway between that derived from an associated area 16 when it is present and that derived from a similar associated area which is absent or not connected. In this way the reference level can be set in the card reader to take account of the tolerances discussed above.

In FIG. 2, each set of areas associated with a particular driven electrode such as 12, has two further half-size associated areas 21 and 22. These can be ignored because at present they form no active part in the arrangement being described. However should it prove necessary to check signals from these areas 21 and 22 as well as from area 20 to gain an average value for determining the reference level then this could be done. For example it may prove insufficient to check the output derived from area 20 only in the case of a bent card because the output may not be representative of the conditions pertaining to the areas adjacent the opposite ends of the card.

Figure 3:
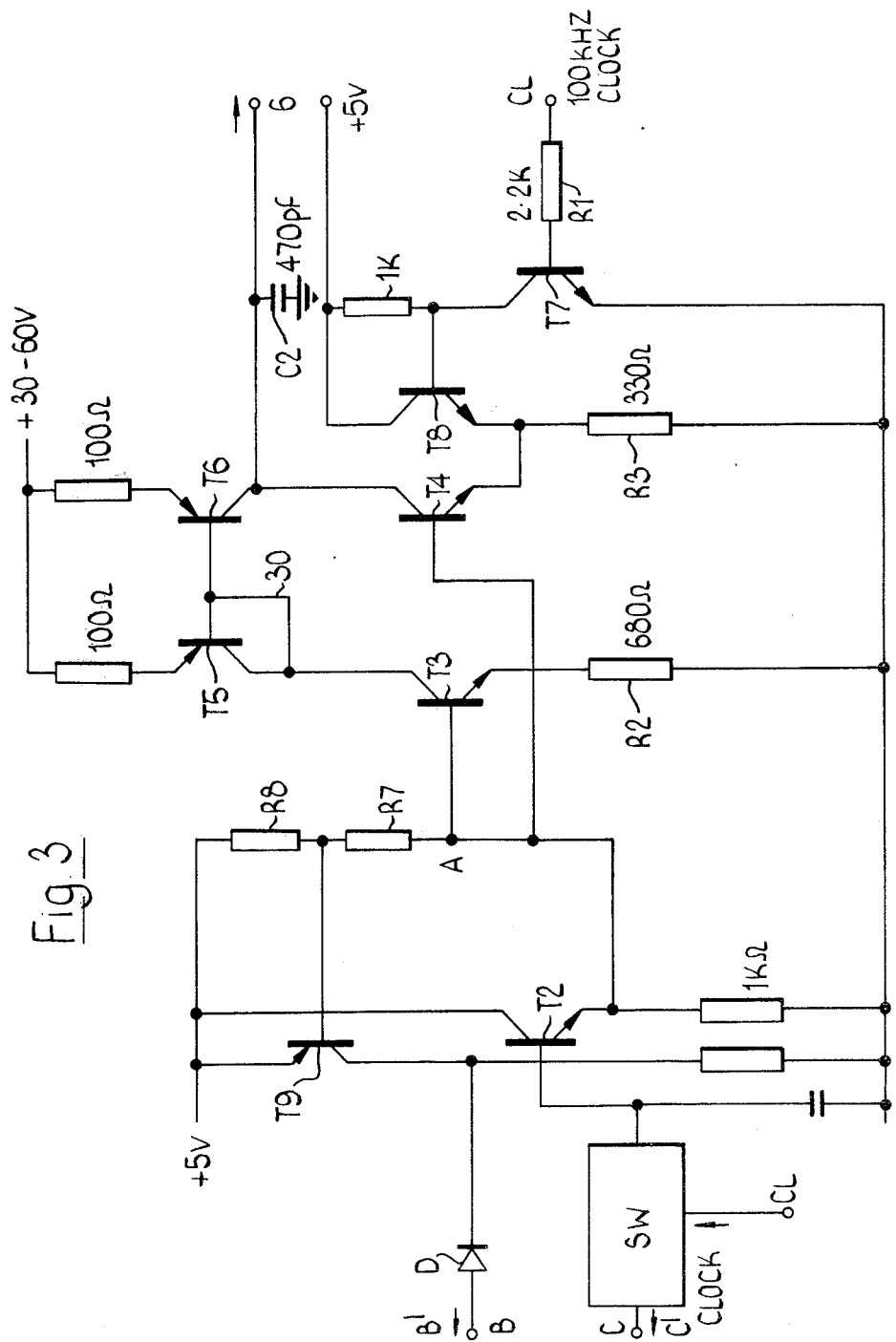
FIG. 3 is a circuit diagram of a drive and compensation circuit of the card reader.
Figure 3A:
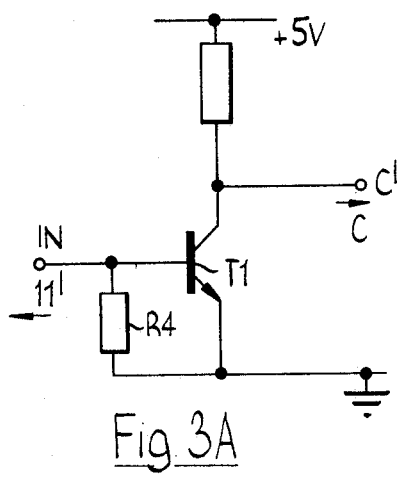
FIG. 3A and FIG. 4 are each a circuit diagram of a sense circuit of the card reader.

A circuit for driving the drive electrodes and effecting compensation utilising the half-size areas such as 20, is shown in FIGS. 3 and 3A. There would in the embodiment described be four such circuits, one associated with each of the drive terminals 6, 7, 8 and 9.

Figure 4:
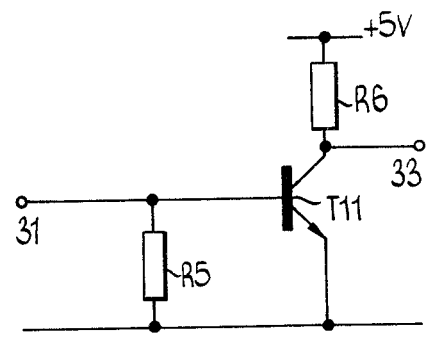

FIG. 4 shows the sense circuit for sensing the output signal appearing at terminals such as 11 and in the embodiment described there would be sixteen such circuits, the terminals 11" pertaining to the presenting redundant areas 21 and 22.

Referring to FIG. 3, and FIG. 3A in combination, the circuit is connected to the printed circuit 1 as shown, the output from transistor $T_6$ being fed to terminal 6 in FIG. 1 and the input to transistor $T_1$ being connected to the "reference" area associated with terminal 11'. As will be described later with reference to FIG. 7, one "sense" circuit as shown in FIG. 3A is connected in common to four circuits $COMP_1$, $COMP_2$, $COMP_3$ and $COMP_4$ via terminals C and C', the "sense" circuit of FIG. 3A operating in the same manner as the "sense" circuit of FIG. 4. Each of the circuits $COMP_1$ to $COMP_4$ is as shown in FIG. 3.

Figure 5:
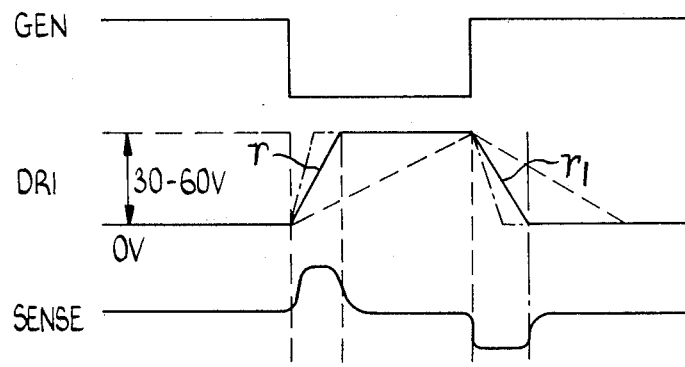
FIG. 5 shows voltage and current waveforms occurring in the circuits of FIGS. 3, 3A and 4.

The output to terminal 6 is a ramp drive voltage DR1 the waveform of which is illustrated in the middle in FIG. 5, and will produce a substantially constant current in the associated capacitive couplings between the card areas 16 and signal electrodes 10, and at the terminal 11'. The effect of the circuit of FIGS. 3 and 3A is to adjust the slope $r_1$ of the ramp voltage so that the current in the capacitive coupling (terminal 11') is just sufficient to turn on transistor $T_1$. In this embodiment the voltage generated by this current to just turn on $T_1$ is approximately 0.6 volts and the circuit will decrease the slope of the ramp voltage applied to terminal 6 so that the current at terminal 11' is just sufficient to turn on transistor $T_1$.

The circuit is basically an analogue circuit and comprises a "sense" transistor $T_1$ coupled via an emitter follower transistor $T_2$ to drive and set the current through two negative current source transistors $T_3$ and $T_4$. The output from transistor $T_1$ to transistor $T_2$ is fed via an analogue switch SW. The clock control line CL controls the switch. When the line is high the impedance from left to right of the switch SW is negligible so any analogue voltage is transferred from left to right. This enables the drive and compensation circuit to be selectively activated as will be described later with reference to FIG. 7. Transistors $T_5$ and $T_6$ form a current mirror feeding C2 and transistors $T_7$ and $T_8$ form a switching circuit to switch on and switch off the transistor $T_4$ under the control of a clock pulse, thus producing a ramp voltage at terminal 6 (See FIG. 5). 60 volts is applied to the rail feeding transistors $T_5$ and $T_6$.

A clock pulse having a frequency of 25 KHz is fed into a line marked "clock" with a waveform as shown in the upper part of FIG. 5, marked "GEN.". This pulse is applied via resistor $R_1$ to switch off transistor $T_7$ which thus turns on transistor $T_7$, and this in consequence turns off transistor $T_4$. Transistors $T_5$ and $T_6$ constitute a current "mirror"; that is to say the current magnitude flowing in $T_5$ will be the same as that flowing in $T_6$. The current flowing in transistor $T_3$ is the same as that flowing in $T_5$ since there is no other path for the current, the base and collector of $T_5$ being connected together by the connection 30. The emitter resistor $R_2$ associated with transistor $T_3$ has twice the value (680Ω) of resistor $R_3$ associated with transistor $T_4$ so that the current through $T_4$ will be twice the current through $T_3$. Hence as transistor $T_4$ is switched off by the clock pulse it no longer pulls down the voltage appearing at terminal 6. Since $T_6$ acts as a constant current drain it produces in conjunction with the large capacitor $C_2$ (470 pf) a positive ramp r as shown in FIG. 5. This process continues until transistor $T_6$ saturates.

During this process the "sense" voltage appearing at terminal 11' will commence at zero and then go positive as shown in the third waveform marked "SENSE" in FIG. 5. Transistor $T_1$ is just turned on.

As soon as the clock pulse voltage rises (the end of the pulse), transistor $T_7$ is turned on again, turning transistor $T_8$ off and the transistor $T_4$ on. This allows the voltage on terminal 6 to fall as a result of the current through $T_4$, forming a negative ramp voltage $r_1$, falling toward ground.

The commencement of the positive ramp produces a positive voltage at terminal 11' through the capacitive couplings between card C and board 1 which rises rapidly toward the positive plateau shown in the lower "sense" waveform of FIG. 5. In order to compensate for the variations in capacitance between the card C and the reader board 1 it is only necessary to adjust the slope of the positive ramp r so that current in the capacitive coupling, formed by area 20 and the signal electrode 10 connected to terminal 11', is just sufficient to produce a voltage drop across a resistor $R_4$ connected across the base/emitter junction of transistor $T_1$, sufficient to just turn on $T_1$. This causes the base voltage of transistor $T_2$ to drop. Transistor $T_2$ is connected in emitter follower configuration. The base of transistor $T_2$ was originally held at substantially the 5 volt rail when transistor $T_1$ was open circuit. As the base voltage of transistor $T_2$ falls, so the voltage of its emitter falls, and this in turn lowers the voltage on transistors $T_3$ and $T_4$ because the emitter of $T_2$ and bases of $T_3$ and $T_4$ are interconnected. As a result the currents through transistors $T_3$ and $T_4$ are reduced which reduces the current through transistor $T_5$ and, because of the mirror action, through $T_6$ also. The current "drained" through transistor $T_4$ remains twice that through $T_3$ hence the slope of the ramp voltage is decreased.

The circuit is self regulating so that the slope of the ramp voltage is maintained at exactly that value which just turns on transistor $T_1$.

Since the area 20 of the card is half that of an area 16 it can confidently be expected that the signal voltage magnitude from a terminal 11 coupled to an area 16 will be up to twice (say 1.2 volts) that of terminal 11' whereas the signal voltage from a terminal 11a coupled with area 16' which is effectively absent in that it is electrically isolated from driven terminal 12 and feed line 12' by a separation zone 12", will be much lower.

Each of the terminals 11 and 11a is connected to an input 31 of a respective sensing circuit such as that shown in FIG. 4. It can be seen that this is similar to the input circuit of FIG. 3A. It comprises an input transistor $T_{11}$ with a "sense" resistor $R_5$ connected between the base and emitter having the same value (68KΩ) as the resistor $R_4$. The collector is coupled to a 5 volt rail via a resistor $R_6$ having a value of 47KΩ. The output of transistor $T_{11}$ is connected to a respective input 33 of the multiplexing circuit to be described later.

Transistor $T_{11}$ will turn on in response to exactly the same input voltage (0.6 volts) as does transistor $T_1$, so that it will turn on in response to a signal from a terminal 11 (binary 1) but will not turn on in response to a signal from a terminal 11a (binary 0).

Figure 6:
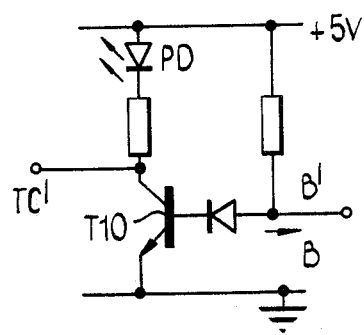
FIG. 6 is a circuit diagram of an indicator circuit of the card reader and FIG. 7 is a block schematic diagram of the card reader including the circuits of FIGS. 3, 3A, 4 and 6, arranged for use with a viewdata terminal.

The circuit of FIG. 6 is an indicator circuit arranged to sense when the card is in the reader. It has an input terminal B' for connection to the corresponding terminal B in FIG. 3. Referring back to FIG. 3 in combination with FIG. 6, an input transistor $T_9$ having a base connected to terminal A via a potential divider network comprising resistors $R_7$ and $R_8$ (4.7K and 10K respectively). The collector of transistor $T_9$ is coupled to the base of transistor $T_{10}$ via diode D and terminals B and B' and there is a light emitting indicator diode PD in the collector of transistor $T_{10}$.

In the quiescent state, transistor $T_{10}$ is off and $T_9$ is off. When the card is placed on the reader and the ramp voltage has been compensated, a drop in voltage at terminal A during the compensation process will switch transistor $T_9$ on, in turn switching on transistor $T_{10}$, causing the L.E.D. to light up and indicate that the card is ready for reading and the terminal is ready to communicate with the computer. The collector is connected to the terminal computer T.C. as shown.

It is pointed out that in order to compensate for variations in capacitances between the card and the reader, it would be possible to use a comparator for each of the sixteen sensing circuits rather than adjusting the ramp voltage applied to the drive electrodes as accomplished by the circuits of FIG. 3 and 3A. In this alternative the drive voltage would remain unadjusted and the threshold level of each input transistor would be adjusted to just respond to the signal detected at terminal 11'. This could be done with a comparator. The other side of the comparator would receive the information signal from the terminals 11 or 11a and depending on whether the information signal is greater or less than the reference signal, a 1 or 0 is produced accordingly.

Figure 7:
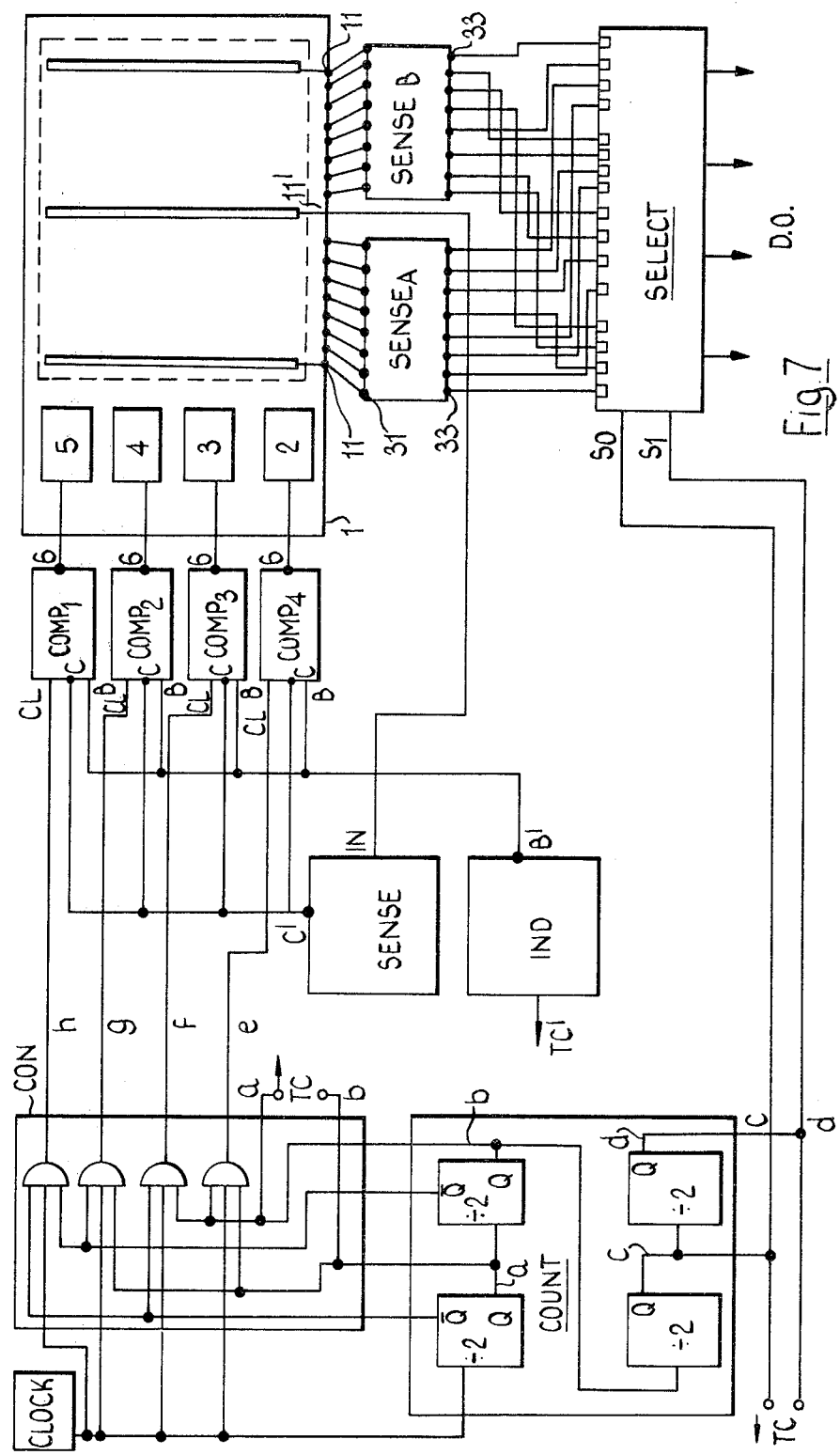

Referring now to FIG. 7 the card reader printed circuit board 1 is shown schematically with the four drive electrodes 2, 3, 4 and 5 connected to respective drive and compensation circuits $COMP_1$, $COMP_2$, $COMP_3$, $COMP_4$ via the terminals 6 of those circuits, each circuit COMP being as shown in FIG. 3. These four circuits are triggered sequentially by a two-to-four converter circuit CON according to the binary input from the clock generator CLOCK via a counter circuit COUNT. The counter circuit COUNT comprises four divide-by-two elements forming a divide-by-sixteen circuit. The viewdata terminal computer TC is already present in the viewdata terminal for controlling its operation and conversing with the (distant) viewdata computer VC (also not shown). The counter circuit COUNT feeds its 0 and 1 binary information to the computer TC (lines c and d). A "word" from the computer herein discussed is four bits long determining a number 0 to 9 (and possibly A-f in Hexadecimal Notation) and being the BCD (binary coded decimal) representation of that number. Lines c and d of the counter COUNT are connected to a selection circuit SELECT. The SELECT circuit is connected respectively to the outputs 33 of the first eight sensing circuits represented by $SENSE_A$ and to the second eight sensing circuits represented by $SENSE_B$. Each SENSE circuit corresponds to that shown in FIG. 4 of the drawings. These in turn are connected via their input terminals 31 to the connection terminals 11 of the printed board 1. A further sensing circuit SENSE is connected to the respective input terminals IN of the four drive and compensation circuits $COMP_1$ to $COMP_4$ and is the circuit shown in FIG. 3A.

It will be recalled that the card shown in FIG. 2 has in each set of conductive areas sixteen conductive areas, each present or absent according to the code and each arranged to form a capacitive coupling or not with the proximate signal electrode 10. The number is coded on the card so that each set of sixteen areas is divided into four groups of four areas, each group of four representing a particular digit of the number in BCD form. Therefore each driven electrode is associated with four digits of the coded number. Hence there are sixteen available digits. In the present system it is necessary to select the appropriate state of the counter COUNT to obtain the appropriate digit and this is what the SELECT circuit does under the control of the counter COUNT, and lines c and d.

When the card is absent from the card reader there is no capacitive coupling in particular to the signal electrode 10 associated with half area 20 connected to connection terminal 11' and hence each of the drive and compensation circuits $COMP_1$ to $COMP_4$ is trying to compensate for no capacitance on its input and thus holds itself in one end condition. As soon as the card approaches the reader electrodes the circuits SENSE and $COMP_1$ to $COMP_4$ recognise this and begin to compensate for the capacitance variation. When that happens an indicator circuit IND as shown in FIG. 6 indicates that the card reader has received the card and has compensated for capacitance tolerances and that as far as the reader is concerned the terminal is ready to communicate with the viewdata computer. The indicator circuit has an output terminal TC' for connection with the terminal computer TC to tell the computer TC that it can start reading, in conjunction with the terminal keyboard by which an instruction is made to dial up the viewdata computer. Hence before the terminal computer carries out that instruction it checks to see that the indicator circuit IND indicates that a card is present in the reader. If there is no card then the terminal computer could be arranged to indicate this on the screen, instructing that a card be inserted before a call can be made in order that the coded number can be sent to the viewdata computer.

With the card in place the terminal computer calls the viewdata computer, which then requests the number. Then the terminal computer TC via the circuit of FIG. 7 reads the coded number and the digits are fed one by one to the viewdata computer. The four address outputs a, b, c and d of counter COUNT are sensed by the terminal computer and the data outputs DO feed the number via the terminal computer to the viewdata computer VC in serial form.

As stated previously the drive and compensation circuits $COMP_1$ to $COMP_4$ are energised sequentially, by means of the CLOCK inputs on lines e, f, g and h to the analogue switch SW in each of the circuits $COMP_1$ to $COMP_4$, and during energisation of each circuit the selection circuit SELECT reads only the four outputs from terminals 33 at any one time corresponding to a group of areas. Then it selects the next group and so on until the four groups, associated with the respective drive and driven electrodes, have been selected and fed to the viewdata computer VC. Then as the next drive and compensation circuit is energised the same thing occurs to extract the next four digits, and then the third and then the fourth. So as the four divide-by-two circuits of the counter COUNT go through each of their sixteen states, the sixteen four-bit words appear at the data outputs DO, each counter state giving a different word. (The divide-by-sixteen counter could alternatively be implemented in software).

If the computer VC recognises the number and accepts it, it indicates the fact to the terminal computer which is then on line to the computer VC for accessing the required information. The recognised number instructs the particular account to be billed for the call.

In the embodiment described in FIG. 7 the selection circuit SELECT comprises two 74 LS 153. T.T.L. integrated circuits and the counter circuit COUNT comprises of two 74 LS 74 integrated circuits.

The card shown in FIG. 1 is drawn on a much enlarged scale, as is the electrode pattern of FIG. 2, and can be made as follows. First a plastic film of known uniform thickness is provided which is completely opaque and which is thin enough to ensure capacitive coupling therethrough but which is thick enough to be physically durable in use. Onto this plastics film a pattern of conductive ink is laid corresponding to the pattern of areas and driven electrodes shown in FIG. 1 but modified according to each individual code to be represented, but not laying certain ones of the conductive areas 16, 17, 18 and 19, or by laying them unconnected to the associated driven terminal, or by laying them connected and subsequently severing their connection for example by laser etching or other means of removing the ink. Preferably the ink layer is very thin, say a few microns.

Then the ink pattern is covered by a second opaque plastics film, either glued onto the first film or moulded on or otherwise affixed, so that the pattern of conductive areas is completely embedded. Preferably the card cannot be opened so as to expose the conductive areas intact, this preventing unauthorised copying or modification to the areas.

The second layer would have an identification marking on it, for example, to identify the authorised user of the card.

Such a card reader has other applications than that described above, for example it could be used with a bank cash withdrawal terminal where the code is used to activate the terminal to dispense the cash and bill the correct account, or with a shop pay desk terminal where goods are exchanged and money transferred to the account of the shop from the account of the person according to the coded card number.

It can be seen that the capacitive card reader described has a number of advantages. In particular it has the ability to provide a very large number of unique codes. It also raises the possibility of, for example, a business man being able to access information of a secret nature to himself only, possibily anywhere in the UK and later on possibily in the world, via telephone lines. The feedback compensation arrangement in the drive and compensation circuits enables reliable operation. Without that the drive electrodes 2, 3, 4 and 5 and the driven electrodes 12, 13, 14, and 15 would need to be very much larger, of the order of at least ten times the size of the sets of electrodes such as 16, 17, 18 and 19 or 10, otherwise a slight variation in the gap between the card and the card reader will render the system unreliable since there is a widely varying amount of electrical signal available because of the capacitive attenuation between the driven and drive electrodes.

I claim:

1. A card reading system comprising: a card reader having a plurality of first conductive areas thereon arranged to co-operate with a plurality of second conductive areas on said card being read to form a plurality of capacitive couplings, said second conductive areas being positioned at spaced locations along a conductive leg connected to a driven electrode on the card, said driven electrode being arranged to be capacitatively coupled to a driving electrode on the reader for charging said capacitive couplings, said locations corresponding to said first conductive areas, said second conductive areas being in a condition selected from present and connected to the leg, present and disconnected from the leg, and absent, according to the desired configuration in accordance with which information is encoded on said card, and test means including at least one of said second conductive areas and the corresponding co-operating first conductive area said test means forming a test capacitive coupling whereby a reference level is set against which the output values of said first conductive areas are compared to enable said card reader to read the information encoded in said card.

2. A system as claimed in claim 1, wherein means are included for applying a ramp voltage to said driving electrode.

3. A system as claimed in claim 2, including means for adjusting the slope of said ramp as a function of said reference level.

4. A system according to claim 1 including an output sensing circuit for each of said plural capacitive couplings, and means for adjusting the threshold response level of each of said sensing circuits as a function of the output of said test means.

5. A system as claimed in claim 1 wherein said plurality of first conductive areas is formed by strips of conductive material lying in parallel juxtaposition on an insulating substrate.

6. A system as claimed in claim 5, including a plurality of sets of said second areas, each of said sets comprising a plurality of said second areas, and a driven electrode individual thereto, and wherein said driven electrodes and thus said sets are sequentially energized.

7. A system as claimed in claim 6, wherein each of said sets has a discrete corresponding test coupling, said coupling being charged sequentially.

8. A system as claimed in claim 1, including means for reading said outputs sequentially.

9. A system according to claim 1, and comprising means for converting said outputs to a multi-digit code which can be used directly or in conjunction with a further code to enable a viewdata terminal to access a viewdata computer in a viewdata system.

10. A system according to claim 9, wherein said multi-digit code represents an account number to which a charge will be billed.

11. A viewdata terminal incorporating a card reader as claimed in claim 1.

12. The card for the system claimed in claim 1, further comprising an insulating substrate, said second conductive areas, and at least one test conductive area for forming said test capacitive coupling, and a driven electrode connected to said second conductive areas for charging the capacitive couplings formed when the card is placed in reading relationship in said card reader, said driven electrode being in one of the conditions of connection and not connected to said second conductive areas such as to define the coded information.

13. A card as claimed in claim 12, wherein said test conductive area has a size which is approximately half that of each of the present second conductive areas.

14. A card according to claim 12, comprising several sets of second conductive areas, said areas of a set being electrically connected to a respective driven electrode for charging said capacitive couplings.

15. A card as claimed in claim 12, in which all said second conductive areas are formed on said substrate and some of the conductive areas are electrically severed from the driven electrode according to a desired configuration.

16. A card as claimed in claim 12, wherein said test conductive area is connected to the same driven electrode as said second conductive areas or associated set of areas.

* * * * *